(12) United States Patent
Cunningham et al.

(10) Patent No.: US 6,343,923 B1
(45) Date of Patent: Feb. 5, 2002

(54) CELLULAR EXTRUSION DIE

(75) Inventors: George M. Cunningham, Horseheads; Lawrence S. Rajnik, Corning, both of NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/453,005

(22) Filed: Dec. 2, 1999

(51) Int. Cl.[7] .............................................. B25C 47/12
(52) U.S. Cl. .................... 425/190; 425/467; 264/177.12
(58) Field of Search .................................. 425/467, 380, 425/190; 264/177.12

(56) References Cited

U.S. PATENT DOCUMENTS

| | | | |
|---|---|---|---|
| 3,790,654 A | | 2/1974 | Bagley ........................ 264/177 |
| 3,983,283 A | * | 9/1976 | Bagley ........................ 428/116 |
| 4,139,144 A | * | 2/1979 | Cunningham ............... 228/182 |
| 4,550,005 A | | 10/1985 | Kato ............................ 264/177 |
| 4,740,408 A | * | 4/1988 | Mochida et al. ............ 428/116 |
| 4,875,264 A | | 10/1989 | Inoue et al. ............... 29/163.6 |
| 5,487,863 A | * | 1/1996 | Cunningham et al. . 264/177.11 |

FOREIGN PATENT DOCUMENTS

JP          57-173431          10/1982

* cited by examiner

*Primary Examiner*—Nam Nguyen
*Assistant Examiner*—Joseph S Del Sole
(74) *Attorney, Agent, or Firm*—Silvy A. Murphy; Kees van der Sterre

(57) ABSTRACT

An extrusion die for forming a cellular honeycomb structure having a finned protrusion extending from at least one cell wall of the honeycomb structure. The extrusion die is a composite extrusion die that comprises a primary extrusion die body having an inlet face and an outlet face, and at least a first insert member that is secured into a first intersection formed by a pair of intersecting slots at the outlet face of the primary extrusion die body. More preferably, a plurality of insert members are secured into a plurality of intersections, each intersection being formed by a pair of intersecting slots and each of the intersections being defined by four pegs/pins at the outlet face of the primary extrusion die body. Each of the insert members is adapted to fit into one of the intersections of the die body, where the size and shape of the insert members and the positioning of the insert members into a plurality of the intersections cuts off the flow path of an extrudable material through the plurality of the intersections. Thereby, when a cellular honeycomb structure is extruded through the composite extrusion die, the honeycomb structure comprises a plurality of finned protrusions extending from a plurality of the cell walls of the honeycomb structure corresponding to the plurality of the intersections of the die body into which the insert members are secured.

9 Claims, 9 Drawing Sheets

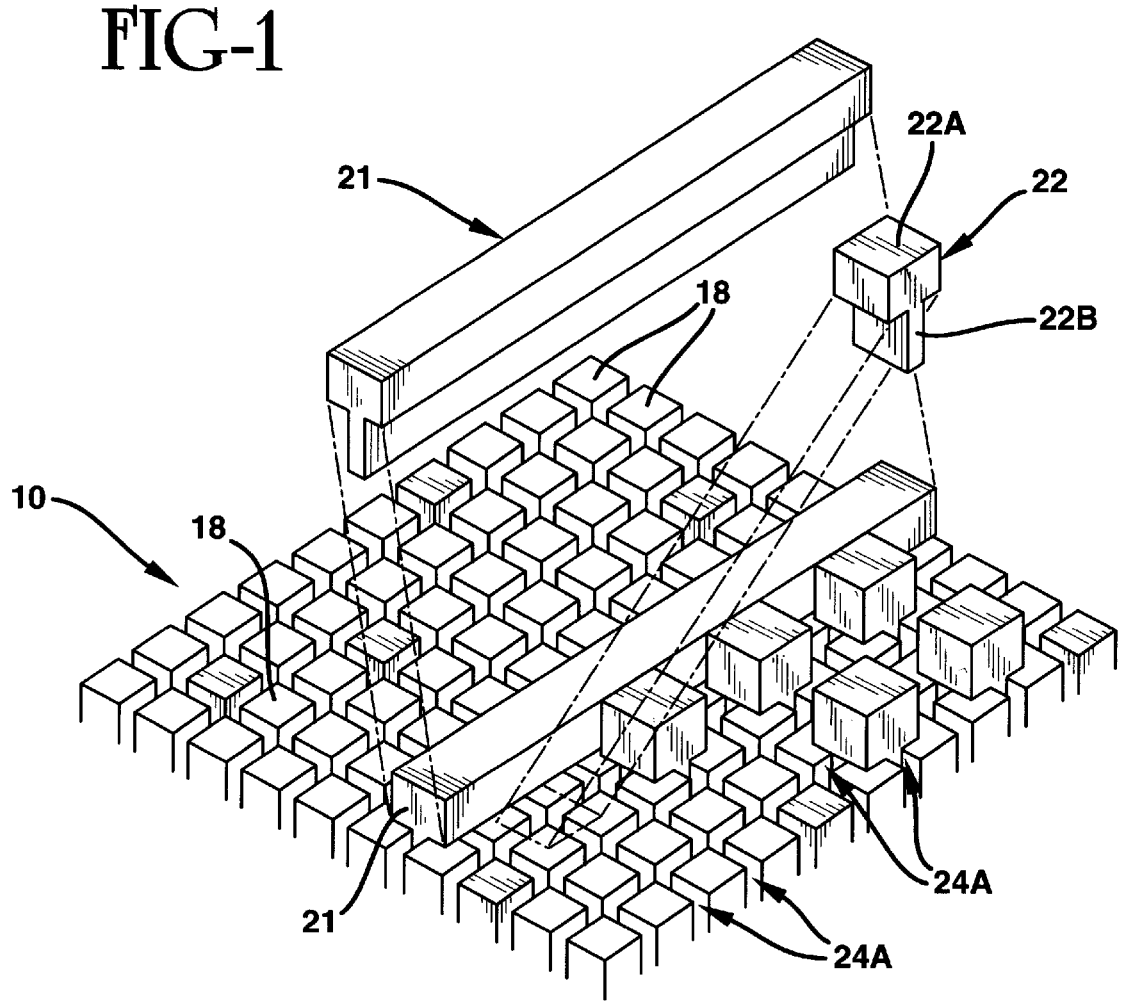

CELLULAR EXTRUSION DIE

FIELD OF THE INVENTION

The present invention relates to extrusion dies and a method for making a cellular honeycomb structure, particularly, ceramic honeycomb structures for use as catalytic converters in the exhaust stream of internal combustion engines. While the invention may be used in other types of dies, it is especially suited for use in extrusion dies for manufacturing thin-walled honeycomb structures from an extrudable material, such as ceramic, and will be particularly described in that connection.

BACKGROUND OF THE INVENTION

As the use of ceramic honeycomb structures in catalytic systems has increased, so has the need for efficient ceramic honeycomb structures. The efficiency of a catalytic converter is a function of the surface area available to the exhaust stream for interaction with the noxious output of internal combustion engines. Hence, by increasing the cell density of the structure or by increasing the surface area per cell, the efficiency of a catalytic converter can be significantly enhanced. One way to increase the cell density of a honeycomb structure is to increase the number of the discharge/outlet slots in an extrusion die. Typically, an extrusion die includes feed holes/feed channels that originate at one end, and which are longitudinally aligned and in communication with a criss-crossing grid of discharge slots that form pins/pegs terminating at an opposite end, that is on an outlet face of the die. The specific layout and construction of the discharge/outlets in an extrusion die dictates the size and shape of the cells in a honeycomb structure that is extruded from that die. By increasing the number of the discharge/outlets, the cell density of the honeycomb structure is increased. However, to ensure the formation of a fully knitted honeycomb structure, it becomes necessary to increase the number of feed holes to compensate for the increase in the number of discharge/outlets, so that proper batch flow of an extrudable material through an extrusion die is maintained.

Another way to increase the efficiency of a catalytic converter is to increase the surface area of a cellular honeycomb structure. One way of increasing surface area is to form protrusions or extension surfaces in a cell of the honeycomb structure. Protrusions can be formed by compound slot extrusion dies in instances where the extrudable material being delivered through the partial discharge/outlets of the die fails to fully knit, thus, resulting in a break in a cell wall. However, the accuracy of the size and the variability of the protrusions are difficult to control precisely. Alternatively, shorter length partial discharge/outlets can be machined into the face of the pins/pegs in an existing extrusion die to accurately control the protrusion lengths. However, this would require cutting the face of the pins/pegs by an expensive machining process.

In light of the foregoing, it is desirable to provide an extrusion die that can be used to form a honeycomb structure with a greater surface area. In addition, it is desirable to provide a method for modifying an existing extrusion die in combination with a device that can be easily attached to the existing extrusion die that can produce accurate protrusions in a honeycomb structure. Furthermore, it is desirable to provide an affordable method of making extrusions dies for forming honeycomb structures with greater surface area. Also, it is desirable to provide a method for making a cellular honeycomb structure where the cell density can be varied within the structure.

SUMMARY OF THE INVENTION

Accordingly, the present invention is directed to a composite extrusion die and a method of manufacturing a composite extrusion die that forms a cellular honeycomb structure with a greater surface area that substantially obviates one or more of the limitations and disadvantages of the related art. The principal advantage of the present invention is the provision of an arrangement that overcomes the limitations and disadvantages of the described prior arrangements. Additional features and advantages of the invention will be set forth in the description that follows, and in part will be apparent from the description, or may be learned by practice of the invention. The objectives and other advantages of the invention will be realized and attained by the apparatus particularly pointed out in the written description and claims hereof as well as the appended drawings.

In accordance with a preferred embodiment of the present invention, the composite extrusion die is for forming a cellular honeycomb structure having at least one finned protrusion extending from at least one cell wall of the cellular honeycomb structure. The composite extrusion die comprises a primary extrusion die body having an inlet face and an outlet face, and at least a first insert member that is secured into a first intersection formed by a pair of intersecting slots at the outlet face of the primary extrusion die body. More preferably, a plurality of insert members are secured into a plurality of intersections, each intersection being formed by a pair of intersecting slots at the outlet face of the primary extrusion die body, where each of the insert members is adapted to fit into each of the respective intersections of the die body and where the size and shape of the insert members and the positioning of the insert members into the intersections cuts off the flow path of an extrudable material through the respective intersections whereby the cellular honeycomb structure that is extruded from the composite extrusion die comprises a plurality of finned protrusions extending from at least one of the cell walls of the honeycomb structure corresponding to the intersection into which the insert member is secured in the die body. The invention also provides a method for increasing the surface area of a cellular honeycomb structure by producing a protrusion in at least one cell wall of a honeycomb structure, preferably, producing a protrusion in each cell wall of the honeycomb structure. Further, the size and variability of these protrusions is controlled by securing an insert member into at least one intersection, preferably, a plurality of intersections at an outlet face of the extrusion die, where each of the insert members is designed to either partially or completely obstruct the intersection. Further, in a preferred embodiment, each of the insert members is secured in place by using an adhesive or epoxy. In the invention, each of the intersections is formed by two discharge/outlet slots that intersect each other at a right angle and is defined by four pins/pegs on the outlet face of the extrusion die with each of the insert members being securely inserted into one of the intersections. Further, in a preferred embodiment, each of the intersections into which an insert member is inserted is not directly connected to a feed channel. In a preferred embodiment, the method includes inserting a plurality of insert members that are either in the form of a fixed cross-shaped or a pair of interlocking plates or a pin that is securely inserted into the respective intersections of the extrusion die, whereby, the batch flow path can be defined and, hence, the surface area of each cell that makes up a honeycomb structure can be varied as desired. Further, in one embodiment, all of the intersecting outlet slots are of the same slot width and slot depth, whereas, in another embodiment, alternating intersecting outlet slots have the same slot width and slot depth, where a first array of the alternating intersecting outlet slots are primary outlet slots and where a second array of the alternating intersecting outlet slots are secondary outlet slots. Each of the secondary outlet slots are at least equal in width to each of the primary outlet slots, and each of the secondary outlet slots are smaller in depth than each of the primary outlet slots. In a preferred embodiment, each of the secondary outlet slots are larger in width than each of the primary outlet slots, and each of the secondary outlet slots are smaller in depth than each of the primary outlet slots.

To achieve these and other advantages and in accordance with the purpose of the invention, as embodied and broadly described, the extrusion die is for making a cellular ceramic honeycomb structure used in catalytic systems. Furthermore, a method is provided for making the extrusion die and for making the honeycomb structure using the extrusion die of the present invention.

It is to be understood that both the foregoing general description and the following detailed description are exemplary and explanatory and are intended to provide further explanation of the invention as claimed.

The accompanying drawings are included to provide a further understanding of the invention and are incorporated in and constitute a part of this specification, illustrating embodiments of the invention, and together with the description serve to explain the objects, advantages, and principles of the invention.

BRIEF DESCRIPTION OF THE DRAWINGS

FIG. 1 is a partial perspective view of an extrusion die demonstrating an embodiment of the present invention.

DESCRIPTION OF THE PREFERRED EMBODIMENTS

The invention disclosed herein generally embodies the provision of a cellular extrusion die for manufacturing a cellular honeycomb structure used as catalytic converters in the exhaust stream of internal combustion engines. More specifically, an aspect of the invention resides in providing a composite cellular extrusion die that is suited for manufacturing a cellular honeycomb structure having one or more finned protrusions extending from one or more of the cell walls, thus, allowing for variability in the cell density within a particular honeycomb structure. In a broad aspect, the composite cellular extrusion die is comprised of a primary extrusion die body having an inlet face and an outlet face, and at least a first insert member that is received into a first intersection formed by a pair of intersecting slots at the outlet face of the primary extrusion die body. Preferably, a plurality of insert members are received into a plurality of intersections, each intersection being formed by a pair of intersecting slots at the outlet face of the primary extrusion die body, where each of the insert members is adapted to fit snugly into each of the respective intersections of the die body. In general, the size and shape of the insert members and the positioning of the insert members into one or more intersections cuts off the flow path of an extrudable material through the one or more intersections of the composite cellular extrusion die, thus, creating the cellular honeycomb structure having one or more finned protrusions extending from one or more of the cell walls of the honeycomb structure corresponding to the one or more intersections into which the insert members are secured in the die body.

Figure 7:
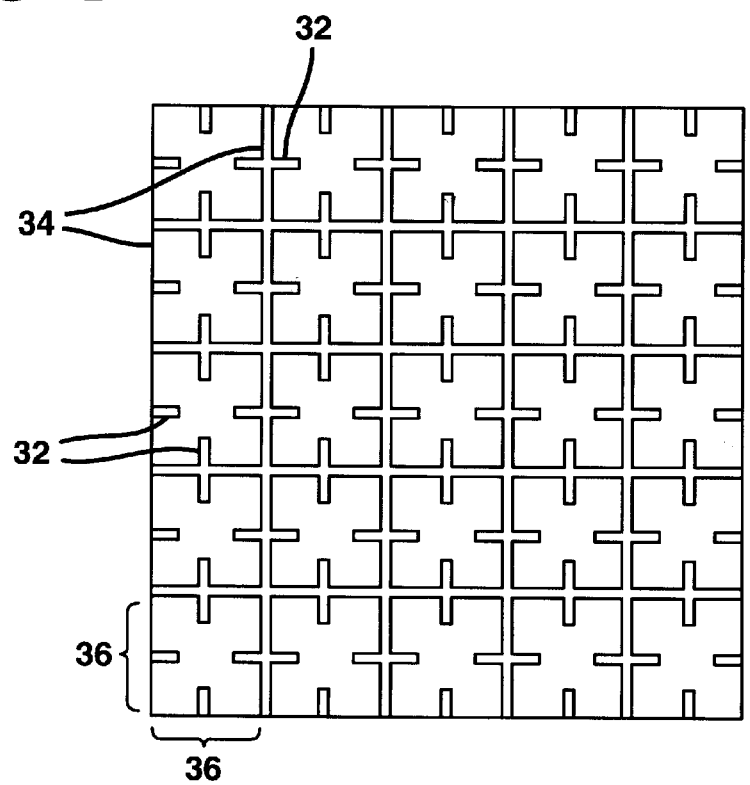
FIG. 7 is a plan view of a cellular honeycomb structure manufactured in accordance with an embodiment of the present invention.
Figure 8:
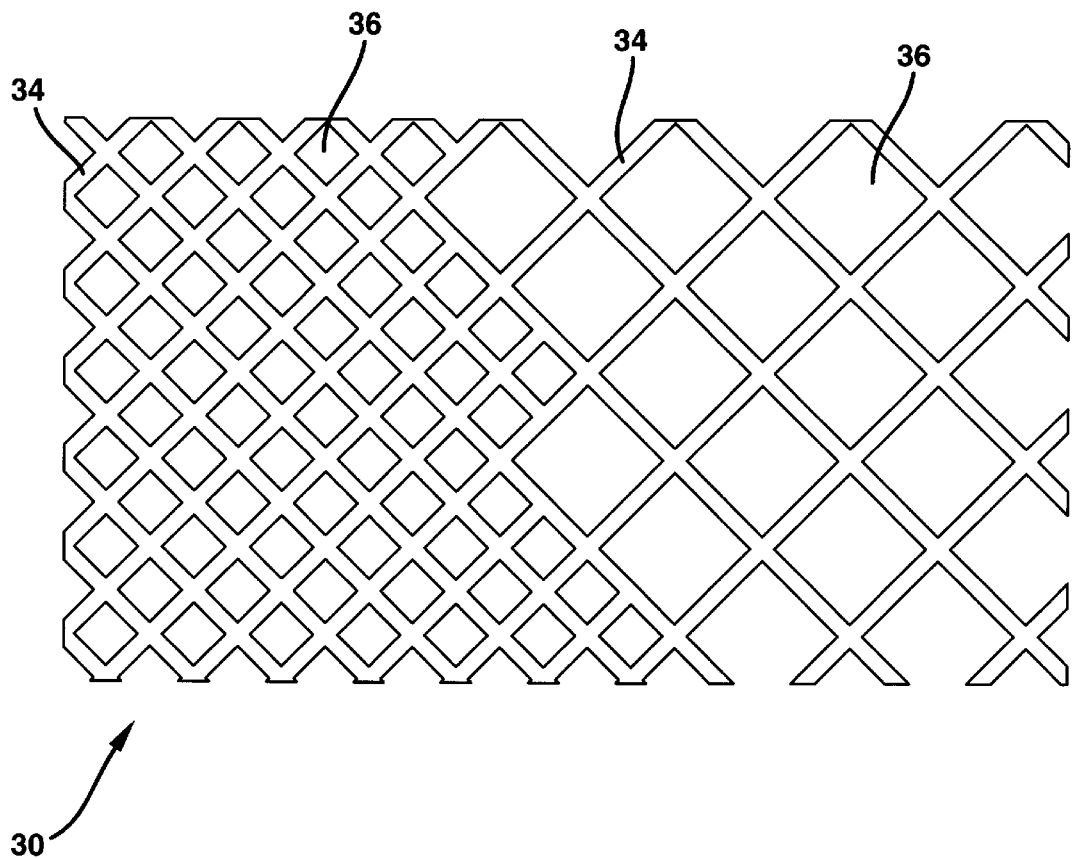
FIG. 8 is a partial plan view of a cellular honeycomb structure manufactured in accordance with an embodiment of the present invention.

In another broad aspect, the invention provides a method for increasing the surface area of a cellular honeycomb structure by producing protrusions in one or more cell walls of a honeycomb structure. Further, the size and variability of these protrusions is controlled by the utilization of insert members that are designed to either partially or completely obstruct each of one or more intersections of an extrusion die and are in a preferred embodiment secured in place by using an adhesive or epoxy. In the invention, each of the intersections are formed by two discharge/outlet slots that intersect each other at a right angle and each of the insert members is placed in such an intersection surrounded by four pins/pegs on an outlet face of the extrusion die. By inserting a plurality of insert members that are either in the form of a fixed cross-shaped insert member or a pair of interlocking plates or a pin into specific intersections of an extrusion die, the batch flow path can be defined and, hence, the surface area of each cell that makes up a honeycomb structure can be varied as desired. For instance, by selectively inserting cross-shaped insert members into specific intersections in only a first-half region of an outlet face of an extrusion die, the honeycomb structure that is manufactured will have cells in that first-half region that are relatively larger in size than a second-half region, where the insert members completely block the formation of complete walls in that first-half region. Alternatively, if each of the insert members are designed to partially obstruct intersections in a first-half regions, then the cells in that first-half region will have finned protrusions extending from each wall of these cells, thus, providing a honeycomb structure with a greater surface area. On the other hand, if cross-shaped insert members are inserted into each intersection formed by four pins in a uniform fashion throughout the outlet face of the die, the extruded honeycomb structure would have finned protrusions extending from each wall of the corresponding cells, as shown in FIG. 7. Thus, by changing the size and shape of the insert members, one can not only partially obstruct an intersection to create finned protrusions, but can completely obstruct an intersection to create a larger cell having no finned protrusions (shown in FIG. 8), thus, allowing for variability in the cell density of a honeycomb structure as desired. Furthermore, by using an adhesive to hold the insert members in place, no additional equipment is required to assemble the extrusion die, which in turn does not add to any repair time that would be associated with equipment failure, if additional equipment was utilized.

Reference will now be made in detail to the present preferred embodiments of the invention, examples of which are illustrated in the accompanying drawings. Turning to the drawings, like numerals indicate the same or similar elements in each of the several views. The drawings are not intended to indicate scale or relative proportions of the elements shown therein. FIG. 1 depicts a perspective view of a extrusion die for forming a cellular honeycomb structure having one or more finned protrusions extending from one or more of the cell walls (shown in FIG. 7) in accordance with one embodiment of the present invention. The extrusion die is designated generally by reference numeral 10.

Figure 2A:
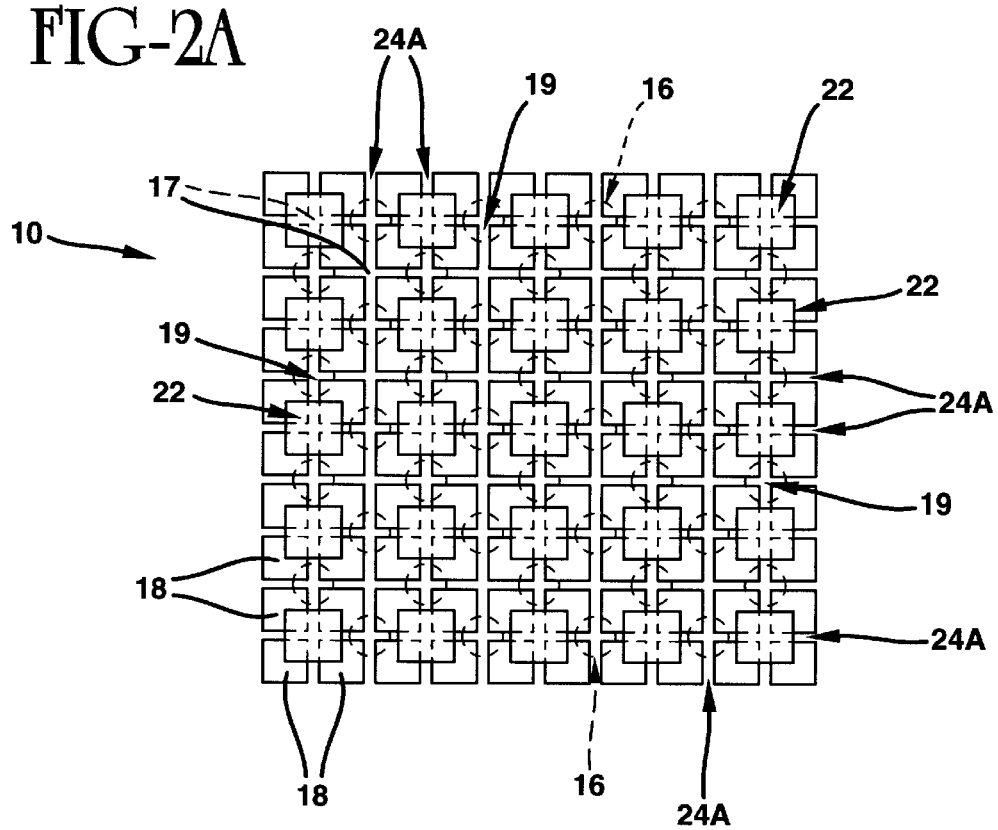
FIG. 2A is a plan view of a standard slot extrusion die demonstrating another embodiment of the present invention.
Figure 2B:
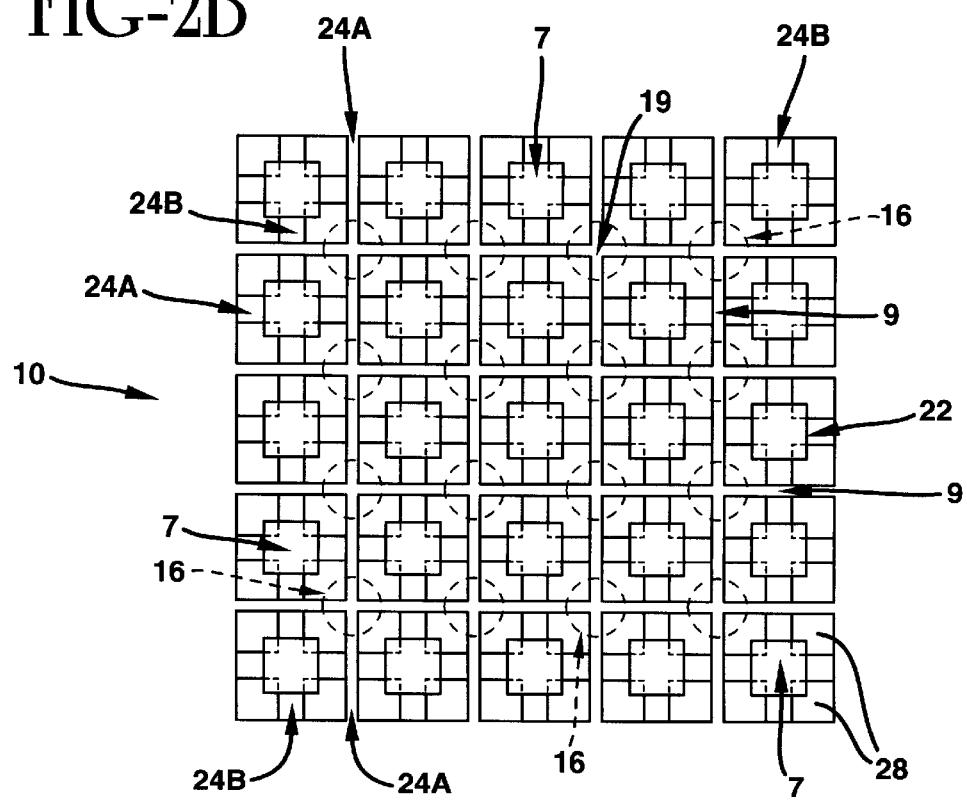
FIG. 2B is a plan view of a compound slot extrusion die demonstrating another embodiment of the present invention.
Figure 3A:
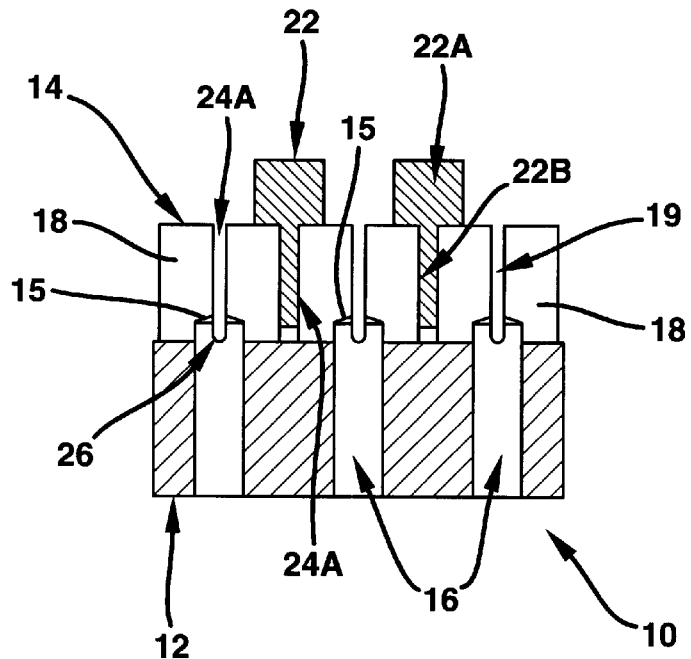
FIG. 3A is a partial cross-sectional view of a standard slot extrusion die in accordance with an embodiment of the present invention.
Figure 4A:
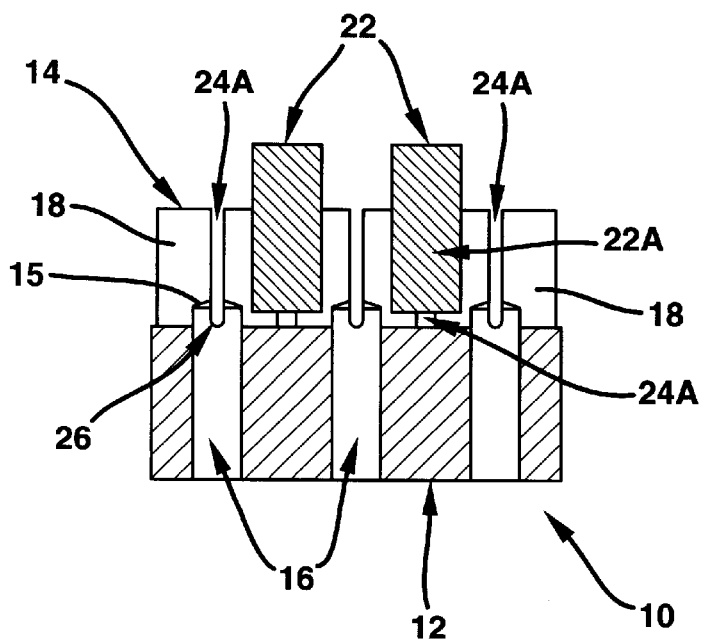
FIG. 4A is a partial cross-sectional view of a standard slot extrusion die in accordance with another embodiment of the present invention.

Referring to FIGS. 3A and 4A, the extrusion die 10 is a standard extrusion die that comprises a substantially flat inlet face 12 and a substantially flat outlet face 14 that is opposite to the inlet face 12. The die 10 further comprises a grid of separate feed channels 16 that originate from the inlet face 12 and terminate at an outlet end 15, which is proximate to the outlet face 14 and within the die 10. A matrix of square-shaped pins 18 (also shown in FIG. 1) originate from within the die 10 and adjacent to the outlet ends 15 of the feed channels 16, with each of the pins 18 terminating at the outlet face 14. Each of the pins 18 are formed by an array of criss-crossing pairs of outlet slots 24A. In addition, the die 10 includes one or more insert members 22 (shown in FIG. 1–4B) that are fixed securely at the outlet face 14 of the die 10 to one or more slot intersections 17 (shown in FIG. 2A) formed by one of the array of criss-crossing pairs of outlet slots 24A. Each of the insert members 22 is constructed to fit into one of the slot intersections 17. The cellular extrusion die 10, further comprises a plurality of alternate slot intersections 19 (shown in FIG. 2A) that are formed by another one of the array of criss-crossing pairs of outlet slots 24A, where each of the alternate slot intersections 19 are separated by one of the slot intersections 17, and where the another one of the array of criss-crossing pairs of outlet slots 24A cuts a central groove 26 (shown in FIGS. 3A through 4B) through a corresponding outlet end 15 of a plurality of the feed channels 16. Moreover, in one embodiment, each of the slot intersections 17 are not directly connected to a feed channel 16, whereas, each of the alternate slot intersections 19 are directly connected to a feed channel 16 as shown in FIG. 2A. Each one of the arrays of criss-crossing pairs of outlet slots 24A are known as primary outlet slots. As shown in FIG. 2A, the grid of feed channels 16 and the array of criss-crossing pairs of outlet slots 24A are positioned such that in any given row every other intersection 19 is in direct communication with a feed channel 16, whereas, every other intersection 17 is not in direct communication with a feed channel 16. In FIG. 2A, the insert members 22 are shown inserted into a plurality of the intersections 17 that are not in direct communication with any of the feed channels 16. As shown in FIGS. 1, 3A–4B, each of the insert members 22 comprises at least one fin portion 22B that is perpendicularly attached to a plate portion 22A. The insert member 22 is inserted such that the fin portion 22B is the end that is inserted into each of the one or more slot intersections 17 and the plate portion 22A, when the insert member 22 is completely inserted, abuts the outlet face 14 of the die 10. Alternatively, the insert member 22 can be inserted sideways (as shown in FIGS. 4A and 4B) such that the fin portion 22B is inserted into one of the slot intersections 17, and the plate portion 22A lies in a transverse slot. Such a placement of the insert members 22 ensures that a honeycomb structure 30 made using such an extrusion die 10 will have fully knitted walls in the unobstructed intersections 19 that do not contain any insert members 22 and partially knitted walls or finned protrusions 32 in the obstructed intersections 17 that contain the insert members 22.

In another aspect, the invention provides a composite cellular extrusion die 10 for forming a cellular honeycomb structure 30 (shown in FIG. 7) having a finned protrusion 32 on each wall of at least one corresponding cell 36. The die, which in a preferred embodiment is a compound slot die (shown in FIGS. 2B, 3B, 4B, 5C and 5D) comprises a substantially flat inlet face 12 and a substantially flat outlet face 14 that is opposite to the inlet face 12, where an array of independent feed channels 16 originate from the inlet face 12 and terminate in a conical outlet end 15 within the die 10. The die 10 further comprises an array of intersecting pairs of primary outlet slots 24A, where an inlet end of each of the primary outlet slots 24A cuts a groove 26 through the conical outlet end 15 of a plurality of the feed channels 16, as shown in FIGS. 3A–4B, and where an outlet end of each of the primary outlet slots 24A terminates at the outlet face 14. Further, as shown in FIG. 2A, a plurality of the array of intersecting pairs of primary outlet slots 24A form intersections 17 that are not in direct communication with any one of the feed channels 16, whereas, another plurality of the array of intersecting pairs of primary outlet slots 24A form intersections 19 that are in direct communication with a plurality of the feed channels 16. The die 10 further includes an array of intersecting pairs of secondary outlet slots 24B (shown in FIG. 5D) that bisect each of the primary outlet slots 24A. Each of the secondary outlet slots 24B originate within the die 10 and terminate at the outlet face 14. Each of the array of intersecting pairs of outlet slots 24B are called secondary outlet slots because none of the secondary outlet slots 24B are in direct communication with any of the feed channels 16, but rather are only in direct communication with the primary outlet slots 24A. Moreover, the array of intersecting pairs of secondary outlet slots 24B divide each of the pins 18 into a group of sub-pins 28 (as shown in FIGS. 2B, 5C and 5D), and in a preferred embodiment, each pin 18 is divided into four sub-pins 28. Although, FIGS. 2B and 5C show a feed channel 16 positioned at every intersection 19 formed by two intersecting primary outlet slots 24A, the feed channel 16 can be positioned such that only every other intersection 19 formed by two intersecting primary outlet slots 24A is in direct communication with a feed channel 16 (as shown in FIGS. 2A and 5D). Finally, the die 10 includes one or more insert members 22, as shown in FIGS. 2B, 5C and 5D, that are fixed securely to one or more alternate slot intersections 7 at the outlet face 14 of the die 10, where the slot intersections 7 are formed by one of the intersecting pairs of secondary outlet slots 24B and are not in direct communication with any of the feed channels 16. As shown in FIGS. 5C and 5D, each of the insert members 22 comprises either a one piece construction that is a cross-shaped insert member 22 (as shown in FIG. 5B) or a two-piece construction made up of a pair of interlocking fins 22C and 22D (shown in FIG. 5A), where one of the intersecting fins 22C is oriented and perpendicularly attached to the other of the intersecting fins 22D. The interlocking fins 22C and 22D are inserted into each of the one or more slot intersections 7, 9 or 17, such that a topmost surface of one of the interlocking fins that is proximate to the outlet face 14 is not above the outlet face 14 of the die 10, and preferably, the topmost surface is flush with the outlet face 14 of the die 10, as shown in FIGS. 5C and 5D. Although, insert members 22 are inserted at a plurality of intersections 7 (in FIGS. 2B, 5C and 5D), insert members can also be placed in the intersections 9 formed by the intersection of a primary outlet slot 24A and a secondary outlet slot 24B, where each of the intersections 9 is not in direct communication with any of the feed channels 16. Furthermore, in yet another embodiment, the insert members 22 are pins 13 (shown in FIG. 6B) that are inserted into one or more slot intersections as shown in FIGS. 6B and 6C. In a preferred embodiment, each of the insert members 22 is fixed securely to one or more intersections 7, 9 or 17 at the outlet face 14 with an adhesive. Additionally, other arrangements and configurations for the insert members 22 will be apparent to one skilled in the art. Regardless of the shape of the insert members 22, each of the insert members 22 inhibits the complete formation of a pair of intersecting walls in the cells 36 of the honeycomb structure 30 that correspond to the intersections 7, 9 or 17 in which the insert members 22 were placed in, such that the cell density of the cellular honeycomb structure 30 is reduced, whereas, the surface area of the honeycomb structure 30 is increased. Accordingly, by extruding an extrudable material, such as, ceramic through the die 10, a cellular honeycomb structure 30 is extruded that has a finned protrusion 32 extending from each wall of one or more cells 36 that corresponds to the selective insertion of one or more of the insert members 22.

Figure 3B:
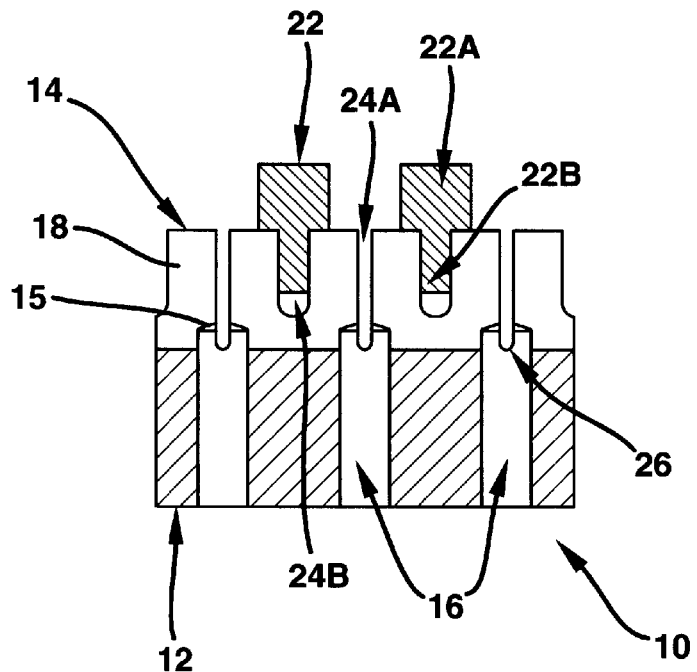
FIG. 3B is a partial cross-sectional view of a compound slot extrusion die in accordance with an embodiment of the present invention.
Figure 4B:
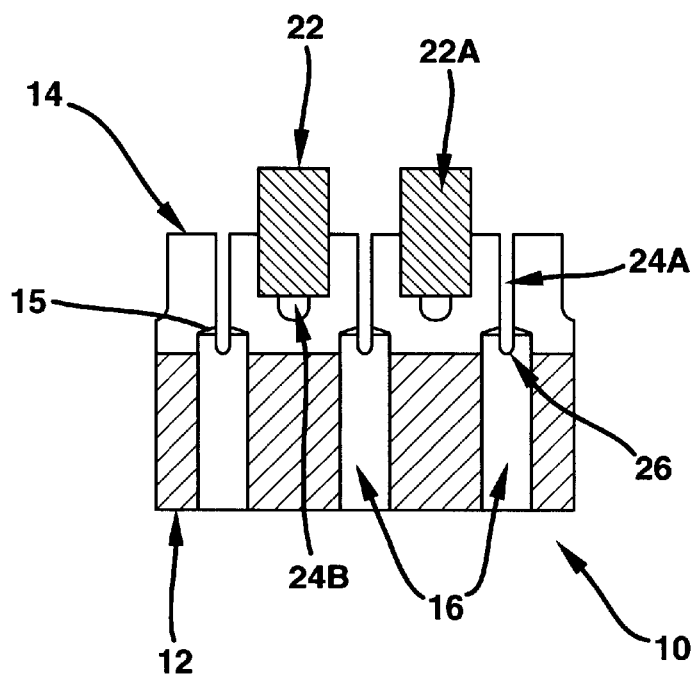
FIG. 4B is a partial cross-sectional view of a compound slot extrusion die in accordance with an embodiment of the present invention.
Figure 5A:
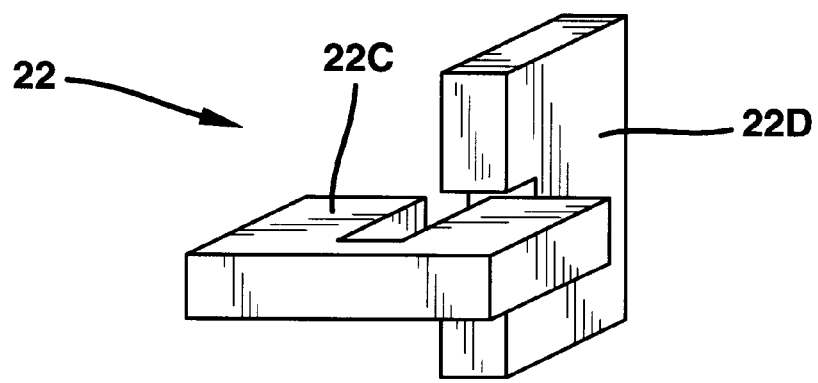
FIG. 5A is a perspective view of an insert member demonstrating an embodiment of the present invention.
Figure 5B:
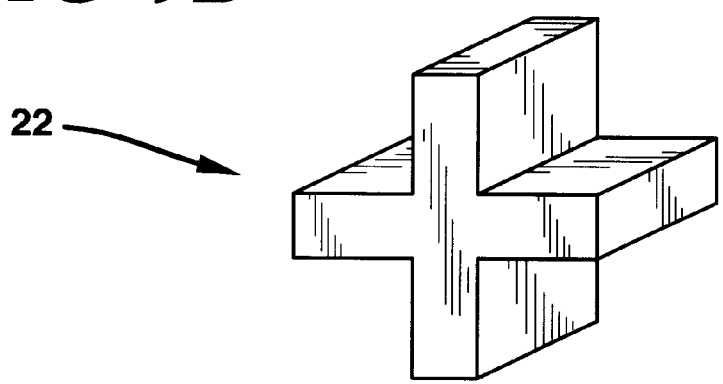
FIG. 5B is a perspective view of an insert member demonstrating another embodiment of the present invention.
Figure 5C:
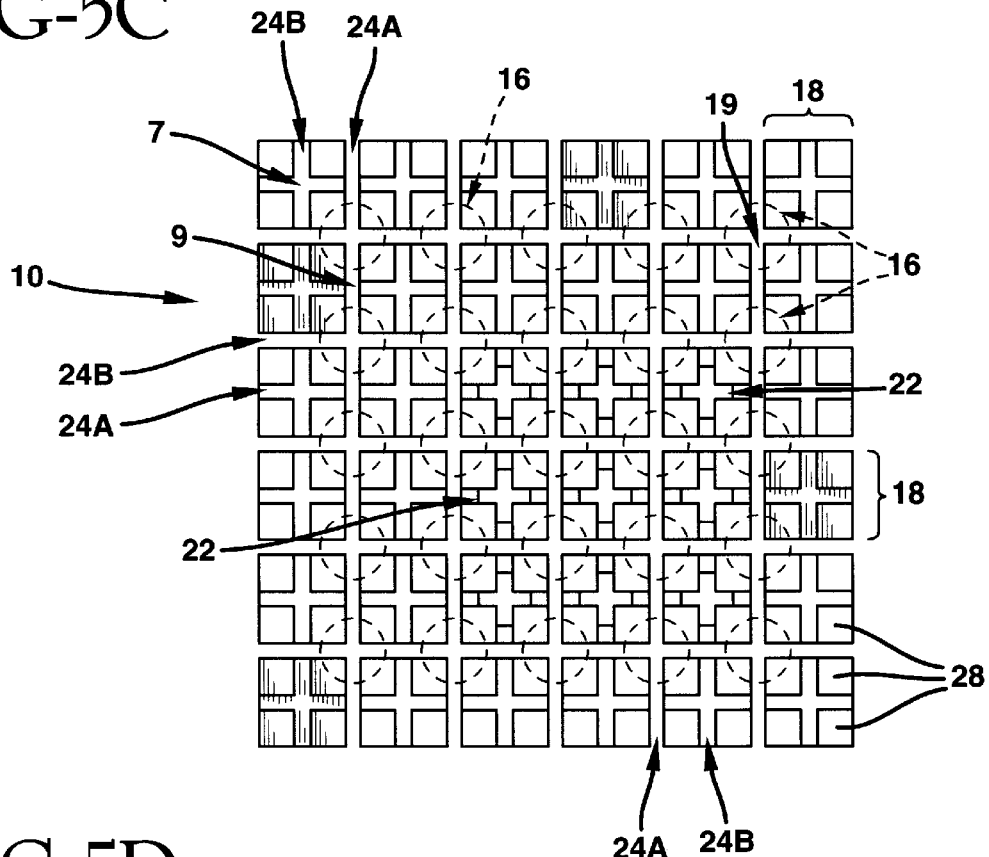
FIG. 5C is a plan view of a compound slot die showing an embodiment of the present invention.
Figure 5D:
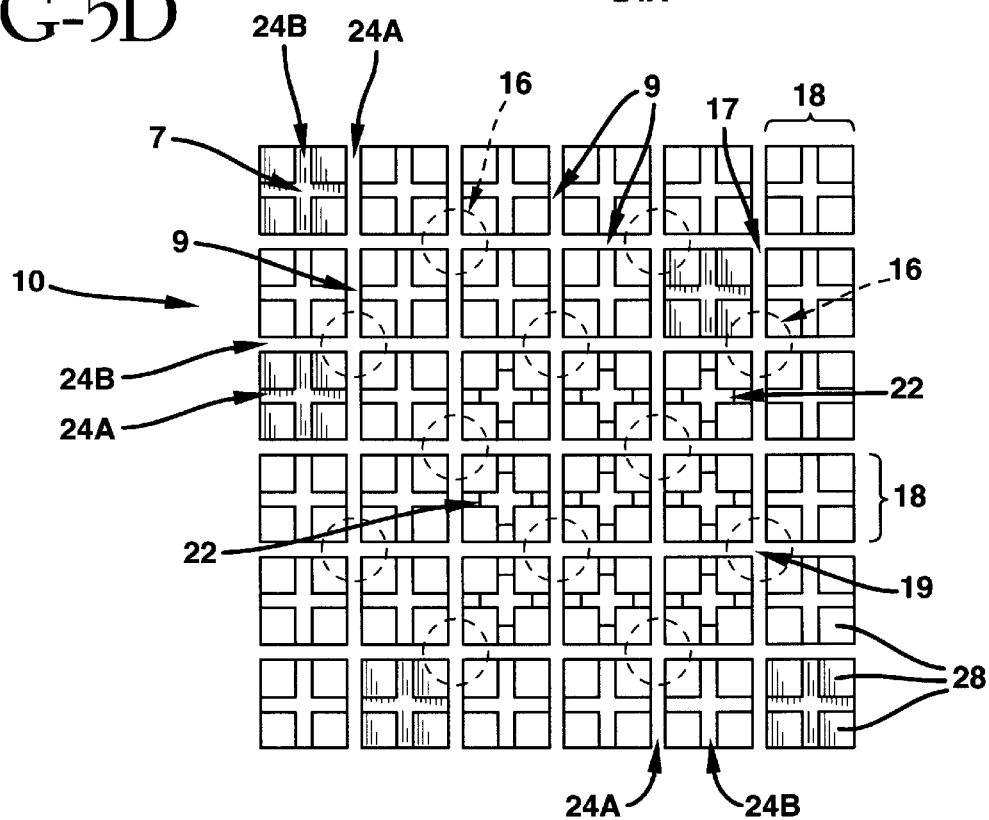
FIG. 5D is a plan view of a compound slot die showing an embodiment of the present invention.

In a preferred embodiment the secondary outlet slots 24B are at least equal in width to each of the primary outlet slots 24A (as shown in FIGS. 5C and 5D), and the secondary outlet slots 24B are smaller in depth than the primary outlet slots 24A (as shown in FIGS. 3B and 4B). In a most preferred embodiment, the secondary outlet slots 24B are wider in width (as shown in FIG. 2B) than the primary outlet slots 24A, but smaller in depth than the primary outlet slots 24A.

Figure 6A:
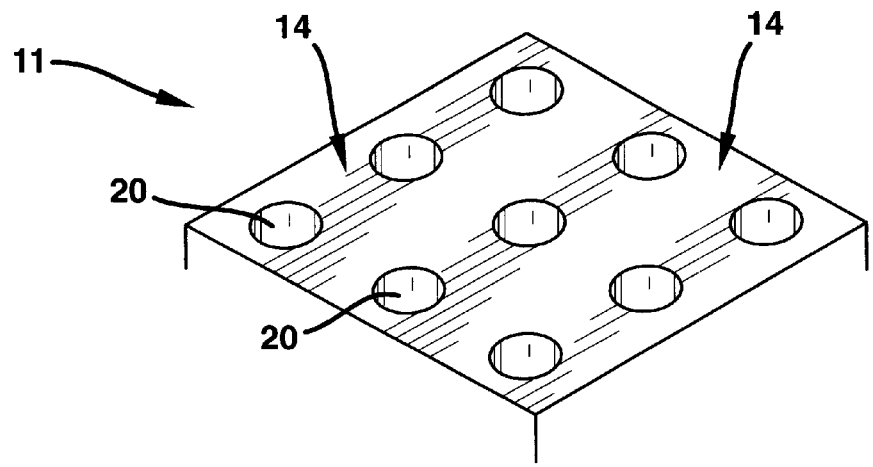
FIG. 6A is a partial perspective view of an incomplete version of an extrusion die demonstrating an embodiment of the present invention.
Figure 6B:
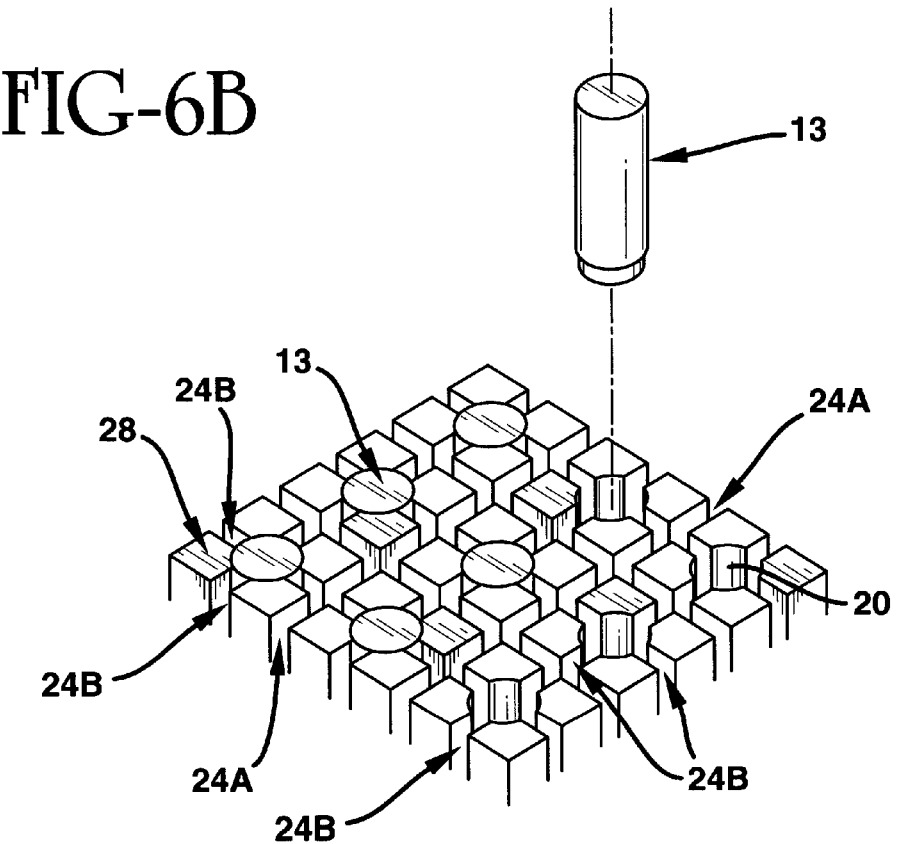
FIG. 6B is a partial perspective view of a completed version of the extrusion die of FIG. 6A demonstrating an embodiment of the present invention.
Figure 6C:
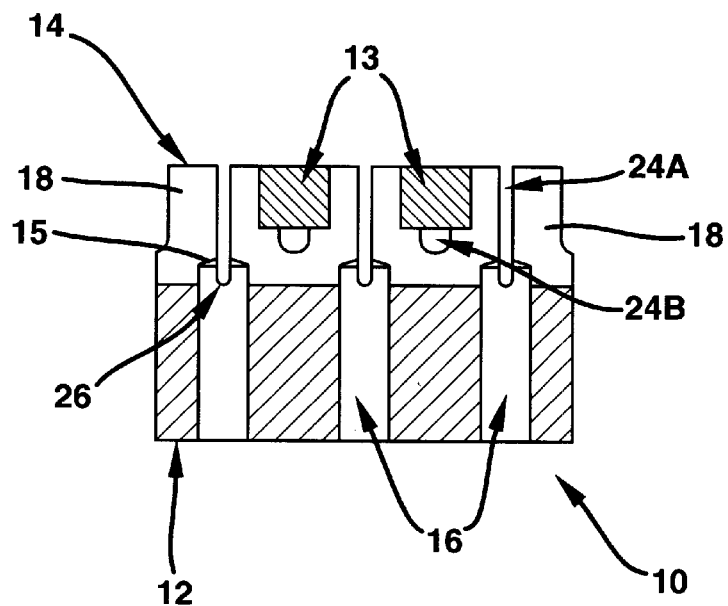
FIG. 6C is a partial cross-sectional view of the extrusion die in FIG. 6B in accordance with an embodiment of the present invention.

The invention further yet provides a method of constructing a composite cellular extrusion die body 10 for making a cellular honeycomb structure 30 having one or more finned protrusions 32 extending from one or more cell walls 34 of at least one corresponding cell 36. The method comprises the steps of providing a cellular extrusion die body 10 that has a substantially flat outlet face 14 and an opposite substantially flat inlet face 12 and drilling at the inlet face 12 a grid of independent feed channels 16 that terminate in a second horizontal plane 15 lying below a first plane 26 in a direction of a batch flow. The method further includes drilling, starting at the outlet face 14, a grid of independent pin holes 20 (shown in FIG. 6A) that terminate in the first horizontal plane 26 of the die body, where each of the pin holes 20 are oriented in the same vertical direction as the feed channels 16. The method further includes cutting a matrix of separate rectangular blocks starting at the outlet face 14 and ending at the first horizontal plane 26 of the die body 10, where a pair of any two adjacent blocks forms an intersection at the outlet face 14. The method includes selectively blocking at the outlet face 14 the portion of one or more of the intersections, preferably intersections that are not in direct communication with any one of the feed channels 16.

In a preferred embodiment, the selectively blocking step includes blocking the portion of one or more alternate intersections with a pin 13 that is inserted into each of the pin holes 20, as shown in FIG. 6B. In yet another embodiment, the selectively blocking step includes blocking the portion of one or more alternate intersections with a pair of interlocking fins 22C and 22D, one of the fins 22C being oriented and perpendicularly attached to the other of the fins 22D. Furthermore, in one embodiment, the method includes temporarily inserting a fixture member 21 (as shown in FIG. 1) into the outlet face 14 of the die 10 for facilitating the positioning of one or more of the insert members 22.

In yet another embodiment, the invention provides a method of making a variable cell density cellular honeycomb structure 30 from an extrudable material, the method comprising the steps of providing a composite extrusion die body 10 having a grid of feed channels 16 originating at an inlet face 12 of the die body 10 and terminating at an outlet end 15 within the die body 10. The outlet end 15 is directly connected to a matrix of intersecting pairs of discharge/outlet slots 24A terminating at an outlet face 14. Further, the method includes selectively blocking a plurality of intersections formed by the matrix of intersecting pairs of discharge slots 24A, and flowing, through the inlet face 12, the extrudable material through the feed channels 16. Finally, the method includes discharging at the outlet face 14 the extrudable material through the matrix of intersecting pairs of discharge slots 24A.

In a preferred embodiment, the extrusion die 10 is approximately 1 ¼ inches in thickness and 9 ¼ inches round in diameter and is made of a metal, preferably, either Carbon steel or stainless steel, whereas, the insert members 22 are made of Carbon steel, or tool steel made from extruded or machined shapes. In a preferred embodiment, the honeycomb structure 30 is made by extruding a ceramic material through the extrusion die 10. Also, each of the primary outlet slots 24A has a slot width of approximately 0.009 inches and a slot depth of approximately 0.130 inches, and depending on the product requirements, each of the secondary outlet slots 24B may have a slot width of approximately 0.100 inches and a slot depth of approximately 0.040 inches. Furthermore, in a preferred embodiment, the feed channels 16 in Carbon steel dies are generally drilled with conventional drilling tools, whereas, the feed channels 16 in stainless steel dies are drilled by a process called Electro-Chemical Machining (ECM). Furthermore, the slots 24A and 24B can be cut into the outlet face 14 of the Carbon steel dies using saw discs having a precise set of blades and spacers that cut multiple slots simultaneously. Stainless steel die slots are cut one at a time by a process called Electrical-Discharge Wire Machining (EDM). EDM uses deionized water as part of the cutting process, which can cause Carbon steel dies to rust. Therefore, ECM is used only for cutting stainless steel dies.

Although a preferred embodiment of this invention and certain variations thereof have been described herein, various modifications and variations will be apparent to those skilled in the art without departing from the spirit or scope of the invention. Thus, it is intended that the present invention covers the modifications and variations of this invention provided they come within the scope of the appended claims and their equivalents.

What is claimed is:

1. A cellular extrusion die for forming a cellular honeycomb structure having one or more finned protrusions extending from a plurality of cell walls, said die comprising:
- a substantial flat inlet face and a substantially flat outlet face that is opposite to said inlet face;
- an array of independent feed channels originating from said inlet face, each of said feed channel terminating in a feed channels outlet end within said die;
- an array of intersecting pairs of primary outlet slots, a slot inlet end of each of said primary outlet slots cutting a groove through said feed channel outlet end of each of said feed channels, a slot outlet end of each of said primary outlet slots terminating at said outlet face;
- an array of intersecting pairs of secondary outlet slots that bisect each of said array of intersecting pairs of primary outlet slots, each of said secondary outlet slots originating within said die and terminating at said outlet face; and
- one or more cross-shaped insert members fixed securely to one or more slot intersections of said intersecting pairs of secondary outlet slots at said outlet face of said die, each of said one or more slot intersections not being in direct communication with any of said feed channels.

2. The cellular extrusion die of claim 1, wherein each of said cross-shaped insert members fixed securely to said outlet face of said die inhibits the complete formation of a pair of intersecting cell walls in said honeycomb structure, resulting in said one or more finned protrusions extending from said plurality of cell walls.

3. The cellular extrusion die of claim 1, wherein each of said cross-shaped insert members comprises two intersecting fins, one of said intersecting fins being attached and perpendicular to the other of said intersecting fins.

4. The cellular extrusion die of claim 1, wherein each of said secondary outlet slots are at least equal in width to each of said primary outlet slots, and wherein each of said secondary outlet slots are smaller in depth than each of said primary outlet slots.

5. The cellular extrusion die of claim 1, wherein each of said secondary outlet slots are larger in width than each of said primary outlet slots, and wherein each of said secondary outlet slots are smaller in depth than each of said primary outlet slots.

6. The cellular extrusion die of claim 1, wherein each of said insert members is fixed securely within said one or more slot intersections with an adhesive.

7. A cellular extrusion die for forming a cellular honeycomb structure having a finned protrusion extending from at least one cell wall of said honeycomb structure, said die comprising:
- a substantially flat inlet face and a substantially flat outlet face that is opposite to said inlet face;
- a grid of separate feed channels originating from said inlet face, each of said feed channels terminating at an outlet end within said die and proximate to said outlet face;
- a matrix of square-shaped pins originating from within said die and adjacent to said outlet ends of said feed channels, each of said pins terminating at said outlet face and being formed by an array of criss-crossing pairs of outlet slots; and
- at least one insert member fixed securely to a slot intersection at said outlet face of said die, said slot intersection being formed by criss-crossing outlet slots, the at least one insert member comprising at least one fin portion inserted into said slot intersection and one plate portion attached perpendicularly to said fin portion;
  - wherein said plate member cuts off flow of an extrudable material through a portion of the outlet slot beyond said slot intersection.

8. A cellular extrusion die in accordance with claim 7 wherein the at least one insert member comprises a pair of interlocking fins that are inserted into said slot intersection, one of said interlocking fins being inserted perpendicular to the other of said interlocking fins.

9. A cellular extrusion die in accordance with claim 7 wherein said slot intersection is not directly connected to a feed channel.

* * * * *

UNITED STATES PATENT AND TRADEMARK OFFICE
CERTIFICATE OF CORRECTION

PATENT NO.    : 6,343,923 B1  Page 1 of 1
DATED         : February 5, 2002
INVENTOR(S)   : Cunningham et al.

It is certified that error appears in the above-identified patent and that said Letters Patent is hereby corrected as shown below:

Column 9,
Line 5, "substantial" should be -- substantially --.
Lines 8 & 9, "feed channel terminating in a feed channels" should be -- feed channels terminating in a feed channel --.

Signed and Sealed this

Eleventh Day of June, 2002

Attest:

JAMES E. ROGAN
Attesting Officer  Director of the United States Patent and Trademark Office